United States Patent [19]

Abileah et al.

[11] Patent Number: 5,128,783
[45] Date of Patent: Jul. 7, 1992

[54] DIFFUSING/COLLIMATING LENS ARRAY FOR A LIQUID CRYSTAL DISPLAY

[75] Inventors: Adiel Abileah, Farmington Hills; Charles Sherman, Royal Oak, both of Mich.

[73] Assignee: OIS Optical Imaging Systems, Inc., Troy, Mich.

[21] Appl. No.: 473,039

[22] Filed: Jan. 31, 1990

[51] Int. Cl.$^5$ ............................................. G02F 1/13
[52] U.S. Cl. ........................................ 359/49; 359/48; 359/54; 359/40; 362/268; 362/297
[58] Field of Search ............... 350/338, 339 D, 334, 350/345, 333, 237, 321, 483; 362/268, 297, 342, 335, 347, 355

[56] References Cited

U.S. PATENT DOCUMENTS

| | | | |
|---|---|---|---|
| 4,171,874 | 10/1979 | Bigelow et al. | 350/345 |
| 4,616,295 | 10/1986 | Jewell et al. | 350/345 |
| 4,660,936 | 4/1987 | Nosker | 350/345 |
| 4,704,004 | 11/1987 | Nosker | 350/345 |
| 4,798,448 | 1/1989 | Van Raalte | 350/345 |
| 4,915,479 | 4/1990 | Clarke | 350/345 |
| 4,936,659 | 6/1990 | Anderson et al. | 350/345 |
| 4,984,872 | 1/1991 | Vick | 350/345 |

FOREIGN PATENT DOCUMENTS

| | | | |
|---|---|---|---|
| 2471012 | 6/1981 | France | 350/345 |
| 0066862 | 5/1979 | Japan | 350/365 |
| 0110422 | 5/1988 | Japan | 350/345 |
| 2198867 | 6/1988 | United Kingdom | 350/345 |

OTHER PUBLICATIONS

"Polarized Backlight for LCD", Technical Disclosure Bulletin; vol. 33, No. 1B, Jun. 1990.

Primary Examiner—Rolf Hille
Assistant Examiner—Tan Ho
Attorney, Agent, or Firm—Kenneth M. Massaroni

[57] ABSTRACT

Improved backlighting for a liquid crystal display is provided by an integral diffusing/collimating lens fabricated from a translucent optical media in which glass beads are suspended. The optical media is configured in substantially the same shape as the array of lamps which illuminate the backlit display and serves as both a lens and a diffuser. The lens effect is obtained by positioning the optical media so that the focal length thereof is at the lamp location. In this manner, the optical media behaves as a collimating lens. The optical effect simultaneously occurs at the air-to-material interface. Of course, the translucent material from which the media is fabricated diffuses light so as to uniformly distribute light emanating from said lamps in all directions.

19 Claims, 2 Drawing Sheets

DIFFUSING/COLLIMATING LENS ARRAY FOR A LIQUID CRYSTAL DISPLAY

FIELD OF THE INVENTION

The instant invention relates generally to the field of electronic two dimensional liquid crystal displays, which displays are adapted to provide either still or video images to a remotely positioned viewing audience. The instant invention more particularly relates to the field of backlit active matrix liquid crystal displays having both a light diffusing element and a light collimating element included therein for enhancing the quality of the displayed image while simultaneously decreasing the profile i.e., the depth dimension of those displays.

BACKGROUND OF THE INVENTION

In recent years, a considerable amount of research has been conducted in an effort to develop a low profile (thin), full color, electronic: display system which does not rely upon conventional cathode ray tube technology. In systems such as television receivers, computer monitors, avionic displays, aerospace displays, and other military-related displays, the elimination of cathode ray tube technology is desirable for several reasons, which reasons will be detailed in the following paragraphs.

More particularly, cathode ray tubes are typically characterized by extremely large depth dimensions and thus occupy a considerable amount of floor or counter space. As a matter of fact, the depth dimension may equal the length and width dimensions of the viewing screen. Also, because cathode ray tubes require an elongated neck: portion to provide for the acceleration of an electron beam from the electron gun to the faceplate of the cathode ray tube, they are quite irregular in shape. Additionally, since cathode ray tubes are fabricated from relatively thick glass, they are inordinately heavy, extremely fragile and readily breakable. Finally, cathode ray tubes require a relatively high voltage power supply in order to sufficiently accelerate the electron beam and thus sustain the displayed image.

The reader can readily appreciate the fact that all of the foregoing problems experienced with or shortcomings of cathode ray tubes are exascerbated as the size of the viewing screen increases. Since the current trend, and in fact consumer demand, is toward larger screens; weight, breakability, placement, etc. represent significant commercial considerations. Accordingly, it should be apparent that cathode ray tubes are and will continue to be inappropriate for use those applications in which weight, fragility and portability are important factors.

One system which can eliminate all of the aforementioned shortcomings of the present day cathode ray tube is the flat panel liquid crystal display in which a matrix array of liquid crystal picture elements or pixels are arranged in a plurality of rows and columns. Liquid crystal displays may typically be either transflective or transmissive. A transflective display is a one which depends upon ambient light conditions in order to be viewed, i.e., light from the surrounding environment incident upon the side of the display facing the viewer is reflected back to the viewer. Differences in the orientation of the liquid crystal material housed within each liquid crystal pixel causes those pixels to appear either darkened or transparent. In this manner, a pattern of information is defined by the two dimensional matrix array of darkened (or transparent) pixels. However, and as should by now be apparent, transflective liquid crystal displays cannot be used in a dark or low light environment since there is no light available for reflection off the viewing surface of the display.

Conversely, transmissive liquid crystal displays require the use of illuminating means such as a lamp array operatively disposed on the side of the matrix array of picture elements opposite the viewer. This illumination means or backlight may further include a backreflector adapted to efficiently redirect any stray illumination towards the matrix array of rows and columns of picture elements, thus ensuring that the displayed image is as bright as possible (given the lighting capabilities and characteristics of the backlighting scheme being employed). The instant invention is specifically directed to this field of backlit, high resolution liquid crystal electronic displays.

The characteristics of the backlighting scheme are very important to both the quality of the image displayed by the matrix array of picture elements of the liquid crystal display and the profile, i.e., the thickness dimension, of that liquid crystal display. Accordingly, a great deal of the aforementioned research in the field of said electronic flat panel electronic displays has been dedicated to the design and fabrication of backlighting systems which optimize certain viewing and structural parameters of those flat panel displays. Characteristics which are acknowledged by experts as the most important in the design of optimized backlighting assemblies include; 1) uniformity over large surface areas of the light provided by the backlight over, i.e., the intensity of the light must be substantially the same at each pixel of the large area liquid crystal display; 2) very bright illumination provided by the backlight thus yielding a sharp, readily readable image to a remotely positioned viewing audience; 3) a low profile so that a flat panel liquid crystal display is substantially flat and can be operatively disposed for viewing without occupying an undue amount of the floor or counter space available in a room; 4) the overall design of the backlight which takes into consideration the number, configuration, and redundancy of lamps; 5) the heat effect caused by the number, configuration, redundancy and type of the lamps; and 6) the total power consumed by the lighting scheme which represents an extremely important consideration in hand held (portable) television units.

A number of different backlight configurations, all of which included a plurality of discrete optical components disposed between the plane of the source of backlit radiation and the plane of the matrix array of liquid crystal pixels, have been designed in an effort to maximize each of the desirable characteristics recited hereinabove. For example, those of ordinary skill in the art of liquid crystal display backlighting have attempted to use radiation diffusers in an effort to achieve a more uniform distribution of projected light across the entire viewing surface of the liquid crystal display. This technique, while useful for improving the uniformity of projected light, deleteriously effected the intensity of that projected light (said light appearing soft or washed-out). Thus, additional lamps were required when such radiation diffusers were employed, resulting in an increased heating effect upon the display. Further, due to the fact that such radiation diffusers were, of necessity, positioned an operative distance from both the source of backlighting as well as from the matrix array of liquid crystal pixels, the depth dimension or profile of the electronic, flat panel display was significantly increased.

A second technique employed to enhance the quality of the backlight (and hence the quality of the displayed image) is to operatively dispose a light collimating lens, such as a fresnel lens, between the source of the backlight and the matrix array of liquid crystal picture elements. This design expedient has the effect of producing an intense, sharp image from a minimal number of lamps, while simultaneously providing a high degree of uniformity of projected radiation across the entire viewing surface of even large area displays. However, due to the nature of collimated light, the viewing angle of a display equipped with such a light collimating lens is limited. Indeed, viewing of the displayed image is impossible from any angle other than directly straight-on. Accordingly, a backlit display which employs only a light collimator without a mechanism for increasing the viewing angle has limited commercial applicability, and is wholly inappropriate for the gigantic markets related to television and computer monitors. Additionally, collimating means, such as fresnel lenses, are characterized by an operative focal length. (The focal length is that distance from the light source at which said lens must be disposed in order to properly collimate light emanating from said light source.) Thus, the light collimator has the undesirable effect of increasing the profile of the liquid crystal display. Also, backreflectors are inappropriate for use with light collimating. This is because light reflected therefrom does not originate from a position which is at the focal length of the collimating lens. Hence, light reflected from said backreflector will not be collimated. This results in localized bright spots on the surface of large area displays, degrading the quality of the displayed image.

In an effort to achieve the advantages of both light collimation and light diffusion, routineers in the backlit, flat panel liquid crystal display art have attempted to incorporate both a discrete light diffuser and a discrete light collimator into the same backlit liquid crystal display. Optically speaking, the results have been satisfactory only to the extent that the quality of the displayed image is relatively sharp, intense and uniform; while said image is visible over a relatively wide viewing angle. However, in order to maximize the optical effect of utilizing the diffuser-collimator combination, it was necessary to operatively space the collimator from the source of backlighting radiation, and then to space the diffuser from both the plane of the collimator and the plane of the matrix array of liquid crystal pixels. The result was a substantial increase in the profile, i.e., the depth dimension of the liquid crystal display. Indeed, in typical low profile crystal display systems which include both a light collimator and a light diffuser, the distance from the light source to the diffuser is approximately 17 millimeters. This is to be compared to liquid crystal display systems including the diffuser/collimator lens of the instant invention wherein the distance from the light source is approximately 6 millimeters. It can thus be seen that by including both diffusing and collimating optical components, the profile of a typical flat panel liquid crystal display is significantly increased, thus eliminating one of the principle advantages of liquid crystal display systems; i.e., compactness.

Accordingly, it may be appreciated that there exists a need in the flat panel liquid crystal display art to provide an optical system for use with a backlit, flat panel liquid crystal electronic display which provides a bright, uniform image of high contrast and capable of being viewed over a wide viewing angle, while maintaining a narrow profile.

BRIEF SUMMARY OF THE INVENTION

There is disclosed herein an improved backlit electronic display and specifically a liquid crystal display adapted to provide an image to one or more remotely positioned observers. The improved liquid crystal display is defined by a matrix array of rows and columns of liquid crystal picture elements spacedly disposed from one side of a light source, means for diffusing light emanating from the light source, said diffusing means operatively disposed between said light source and said rows and columns of liquid crystal picture elements, and means for collimating light operatively disposed between said diffusing means and said light source. The improvement in the display of the instant invention residing in the fact that the diffusing means and the collimating means are integrally formed so as to define a unitary diffusing/collimating lens, whereby a bright and uniform distribution of light is provided in a low profile assembly.

The display preferably includes a back reflector which is operatively disposed on the side of the light source opposite the diffusing/collimating lens. In one preferred embodiment, the light source is configured as a single, elongated, serpentined, tubular lamp. In a second, equally preferred embodiment, the light source may be configured as a plurality of discrete tubular lamps, said lamps defining a given lighting configuration. Regardless of whether the light source defines a lighting configuration formed of a single elongated tubular lamp or a plurality of discrete lamps, said diffusing/collimating lens will comprise a multi-lobed, coplanar lens array.

In the case where the serpentined pattern of the tubular lamp array is defined by a single elongated tubular lamp array disposed in a random pattern, the configuration of the multi-lobed diffusing/collimating lens array is substantially identical to the configuration of the random pattern of that tubular lamp array. Alternatively, the serpentined configuration may be defined by a series of generally parallel, elongated, longitudinal axes of the lamps and the multi-lobed coplanar lens array is operatively positioned on the same side of the light source as the matrix array of liquid crystal picture elements so that each coplanar lobe of the array is associated with a corresponding one of the plurality of parallel lamp axes.

In the case where the serpentined pattern of the tubular lamp array is defined by a plurality of tubular lamps, the configuration of the multi-lobed diffusing/collimating lens array is substantially identical to the configuration of the random pattern defined by the discrete lamps. Alternatively, the discrete tubular lamps may be defined by a series of generally parallel elongated longitudinal axes of the lamps and the muti-lobed coplanar lens array is operatively positioned on the same side of the light source as the matrix array so that each coplanar lobe is associated with a corresponding one of the plurality of parallel lamp axes.

The diffusing/collimating lens is characterized by a given focal length and the diffusing/collimating lens is positioned a distance from the light source which is substantially equal to that focal length. Importantly, the material from which the diffusing/collimating lens is fabricated is translucent so as to uniformly diffuse light passing through the diffusing/collimating lens to the matrix array of liquid crystal picture elements. More particularly, the translucent material from which the diffusing/collimating lens is fabricated comprises bead-like elements suspended in a binder. In one preferred embodiment of the invention, the bead-like elements are formed of glass, are of a substantially spherical shape with a diameter of about one-to-one hundred micrometers, preferably a diameter of about three-to-seventy micrometers, and the binder is a polyurethane epoxy resin. In an alternate preferred embodiment, the bead-like elements are formed of a synthetic plastic resin. The critical factor, however is not in the material from which the beads are formed, but rather, the critical factor resides in forming the beads and the binder from materials which are characterized by different indices of refraction. More particularly, a typical index of refraction for the beads is about 1.6 and a typical index of refraction for the binder is about 1.5. Finally, it is preferred that the diffuser/collimator lens be fabricated of a synthetic plastic resin so that said lens can be readily molded to conform to the shape of the lobes of the lamp array operatively disposed therebelow.

It must be emphasized that the improved backlighting arrangement of the instant invention will operate with equal effectiveness in passive displays as well as in active matrix electronic displays. In such active matrix liquid crystal displays, each picture element will include a pair of electrodes having liquid crystal material operatively disposed therebetween and at least one threshold device. Where two threshold devices are employed, they are electrically coupled together at a common node in non-opposing series relationship. The threshold devices preferably comprise diodes formed from deposited thin film layers of amorphous silicon alloy material of p-i-n construction.

These and other objects and advantages of the instant invention will become apparent to the reader from a perusal of the Detailed Description Of The Invention, the Drawings and the Claims, all of which follow immediately hereinafter.

DETAILED DESCRIPTION OF THE INVENTION

Disclosed as part of the instant invention is an improved backlighting assembly for an electronic display, such as a liquid crystal display and most specifically, by way of example and not by way of limitation, to an active matrix liquid crystal display. It is to be specifically noted that while an active matrix liquid crystal display will be described in detail hereinafter as a preferred embodiment, the instant invention can be used with equal advantage in any type of backlit electronic display known to routineers in the art. Therefore, the improved backlighting assembly described herein is adapted to enhance lighting parameters such as brightness, redundancy of lamps, low heat effects, while simultaneously providing a low profile (as defined hereinafter) to the overall depth dimension of the display structure. With the foregoing objectives clearly in mind, the improved assembly can now be described in greater detail.

Figure 1:
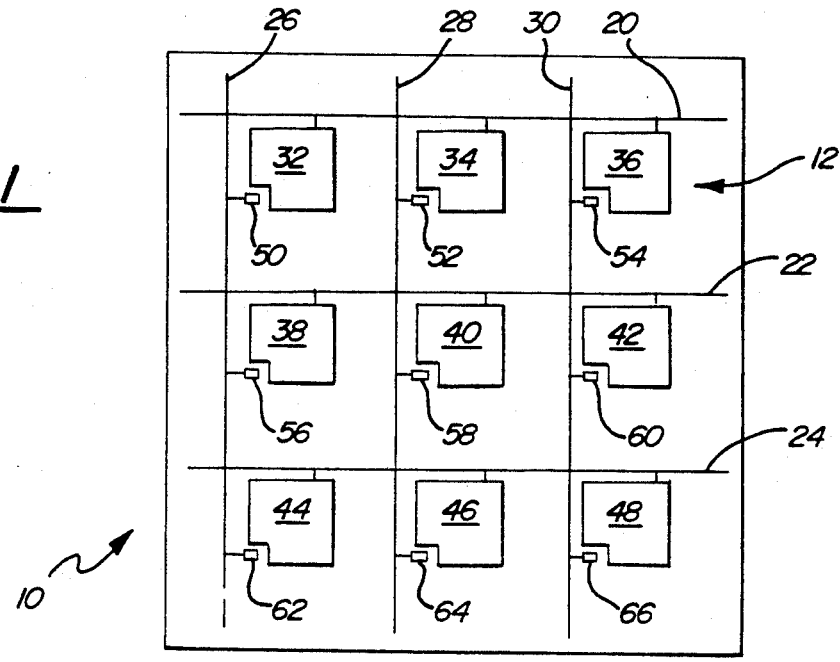
FIG. 1 is a stylistic front elevational view of the matrix array of rows and columns of liquid crystal picture elements of the active matrix embodiment of the electronic display of the instant invention schematically illustrating the manner in which the threshold switching elements are operatively disposed between the address lines and one of the picture element electrodes.

Referring now to FIG. 1, there is depicted therein a matrix array of rows and columns of discrete liquid crystal display picture elements, said matrix array being generally designated by the reference numeral 10. Each liquid crystal display picture element, or pixel, 12 includes two spacedly disposed pixel electrode plates with a light influencing material, such as a liquid crystal composition, operatively captured therebetween. (The electrode plates and the light influencing material will be discussed in detail with respect to FIG. 3.) Each of the pixels 12 further includes a threshold switching device or a plurality of threshold switching devices for selectively applying an electric field across the liquid crystal composition when the electric field exceeds a predetermined threshold value.

More specifically, the matrix array 10 which defines the liquid crystal display of the instant invention includes a first set of X address lines 20, 22 and 24: a second set of Y address lines 26, 28 and 30; and a plurality liquid crystal picture elements 32, 34, 36, 38, 40, 42, 44, 46 and 48. The display further includes at least one isolation or addressing element 50, 52, 54, 56, 58, 60, 62, 64 and 66 operatively associated with and electrically connected to each respective one of the picture elements. As should be readily apparent to the reader from even a cursory review of FIG. 1, the X address lines 20, 22 and 24 and the Y address lines 26, 28 and 30 cross over one another at an angle so as to define a plurality of spaced crossover points associated with respective ones of the liquid crystal picture elements 32–48. The picture elements are formed on a transparent substrate, such as glass, and are distributed thereover in spacedly disposed relation so as to define interstitial spaces therebetween.

Figure 2:
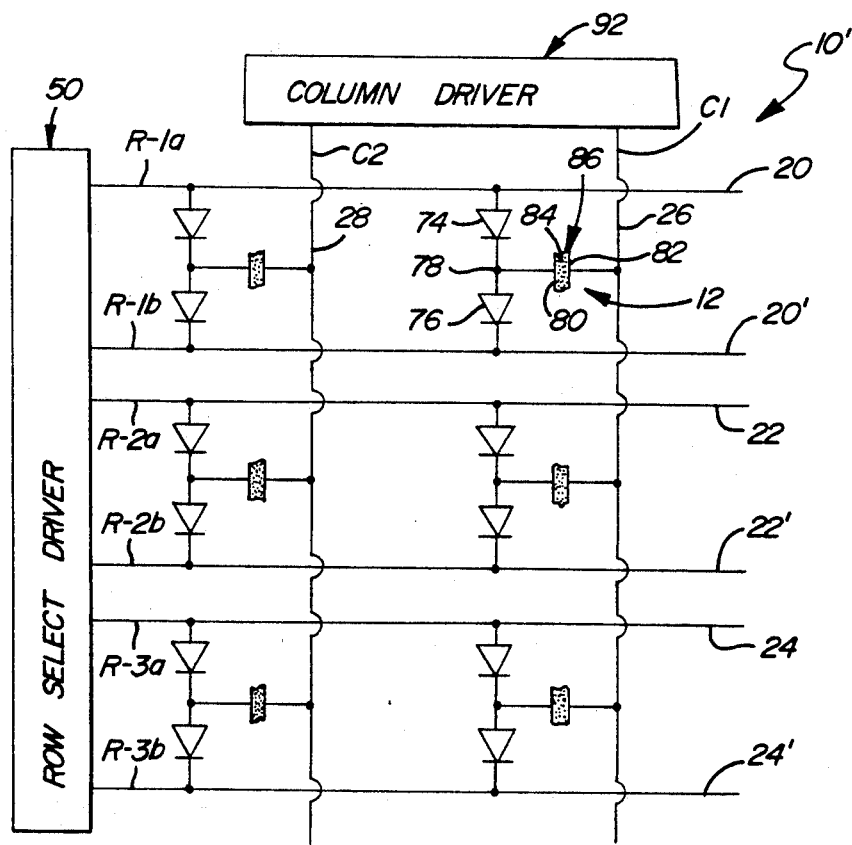
FIG. 2 is an equivalent circuit diagram, as disposed in the active matrix embodiment of the array of FIG. 1, illustrating the relationship between the liquid crystal picture elements and the anode-to-cathode connected diodes by which individual ones of the picture elements schematically depicted in FIG. 1 are addressed.

As can be ascertained from a perusal of FIGS. 1 and 2, each of the threshold devices 50–66 is preferably coupled in non-opposing series relation with a first one of the pixel electrodes. This type of switching arrangement will now be described in greater detail with respect to FIG. 2. In FIG. 2, the matrix array 10, includes a plurality of substantially parallel address line pairs 20, 20′, 22, 22′, 24 and 24′ which are the row select lines and a plurality of substantially parallel column address lines 26 and 28. The column address lines 26, 28, and 30 cross the row select address line pairs at an angle and are spaced from the row select address line pairs to form a plurality of crossover points therewith. Preferably, the column address lines cross the row select line pairs at an angle which is substantially perpendicular thereto.

Since, as mentioned hereinabove, each of the pixels are identical, only pixel 12 will be described in detail in the following paragraphs. Pixel 12, as can be seen from the figures, includes a pair of threshold devices 74 and 76 which are electrically coupled together at common node 78. The threshold devices 74 and 76 are preferably diodes and are electrically coupled together in non-opposing series relationship between the row select address line pair 20 and 20'. Although the threshold devices, in accordance with the preferred embodiment of the invention are diodes, said devices can be of any type which provides a high impedance to current flow when reverse biased and a comparatively low impedance to current flow when forward biased. Therefore, any bidirectional threshold switch or field effect transistor can be utilized with equal advantage. Of course, more conventional electrical interconnections would be employed with field effect transistors.

The picture element or pixel 12 further includes a pair of electrode plates 80 and 82 which are spaced apart and facing one another. Operatively disposed in the space between the electrodes 80 and 82 is a light influencing material 84. The term "light influencing material" is defined and will be used herein to include any material which emits light or can be used to selectively vary the intensity, phase, or polarization of light either being reflected from or transmitted through the material. In accordance with the preferred embodiment of the invention, the light influencing material is a liquid crystal display material, such as a nematic liquid crystal material. In any event, the electrodes 80 and 82 with the liquid crystal material 84 disposed therebetween form a storage element 86 (or capacitor) in which electric charge can be stored. As illustrated, the storage element 86 is coupled between the common node 78, formed by the electrically connected diodes 74 and 76, and the column address line 26.

Still referring to FIG. 2, the display 10 further includes a row select driver 50 having outputs R-1a, R-1b, R-2a, R-2b, R-3a, and R-3b electrically coupled to the row select line pairs 20, 20', 22, 22', 24, and 24'. The row select driver 50 provides drive signals at the outputs thereof to apply first operating potentials which are substantially equal in magnitude and opposite in polarity between the row select address line pairs to forward bias the threshold devices to in turn facilitate the storage of electric charge in the storage elements coupled thereto. The row select driver also applies second operating potentials which are substantially equal in magnitude and opposite in polarity between the row select address line pairs to reverse bias the threshold devices to facilitate the retention of the electric charge stored in the storage elements coupled thereto.

Lastly, the electronic display 10 includes a column driver 92. The column driver 92 includes a plurality of outputs, C1 and C2, which are coupled to the column address lines 26 and 28 respectively. The column driver is adapted to apply a charging potential to selected ones of the column address lines for providing electric charge to be stored in selected storage elements during the application of the first operating potentials to the row select address line pairs by the row select driver 50.

It is preferred that the matrix array of rows and columns of picture elements that combine to make up the improved electronic display 10 of the instant invention utilize a "balanced drive" scheme for addressing each discrete one of the pixels thereof. In this driving scheme, the operating potentials applied to the row select address line pairs are always substantially equal but opposite in polarity. Assuming that the current-voltage characteristics of each of the diodes are substantially equal, a voltage of substantially zero volts will be maintained at the common node 78, at least when the diodes are forward biased. Thus, the voltage applied on the column address line 26 to charge storage element 86 no longer needs to take into account the voltage drop across and/or parasitic charge build-up on one or both of the diodes 74 and 76. Therefore, each pixel in the matrix array of rows and columns may be charged to a known and repeatable value regardless of its position in that matrix array. This permits improved gray scale operation resulting in at least 15 levels of gray scale in large area active matrix displays of the twisted nematic liquid crystal type using normal fluorescent back illumination. The pixels can also be charged more rapidly since the retained charge in the diodes associated with each pixel when they are reverse biased need not be initially dissipated to charge the storage elements. This is because this charge is dissipated when the diodes are first forward biased. A complete description of this driving scheme can be found in U.S. Pat. No. 4,731,610 issued on Mar. 15, 1988 to Yair Baron et al and entitled Balanced Drive Electronic Matrix System And Method Of Operating The Same, the disclosure of which is incorporated herein by reference.

Figure 3:
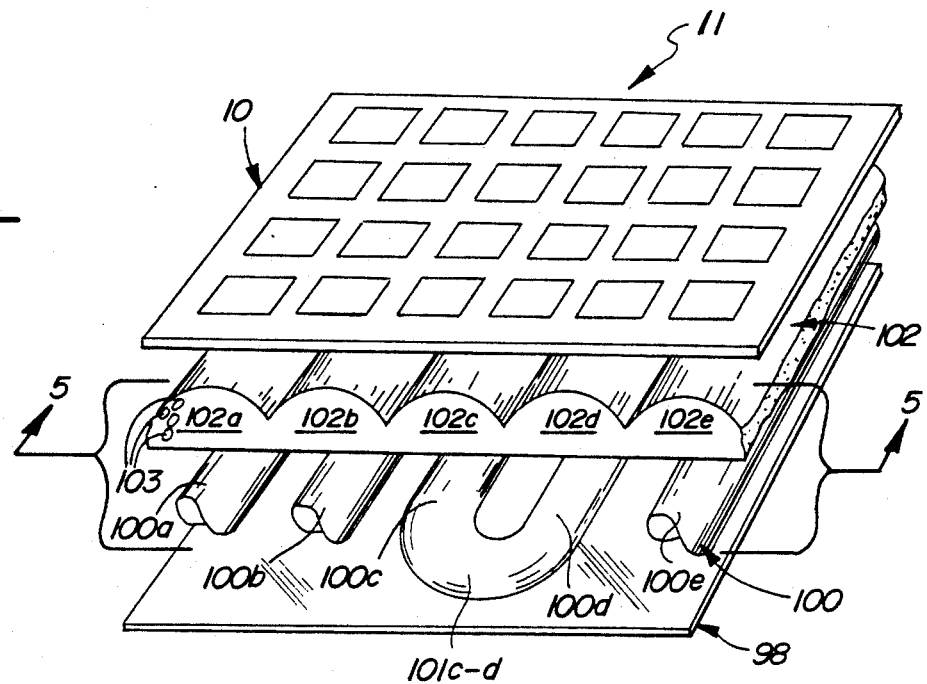
FIG. 3 is a fragmentary perspective view illustrating the relative disposition of one preferred embodiment of the diffusing/collimating lens array of the instant invention relative to a first embodiment of an axially aligned array of tubular lamps.

Turning now to FIG. 3, there is depicted in a fragmentary perspective view, one preferred embodiment of the instant invention. In this embodiment, the diffusing/collimating lens is operatively configured as a coplanar lens array and is disposed so as to provide for a low profile electronic display assembly 11. Before continuing with the detailed description of the preferred embodiment, it is essential to define the manner in which the phrase "low profile" is employed throughout this specification. In this regard, the reader should be aware of the fact that every flat panel electronic display, such as the active matrix liquid crystal type described herein, has a length, a width and a depth dimension. The length and width dimensions of the display are dependent upon the size of the desired viewing surface formed by the rows and columns of the liquid crystal picture elements and the resolution capabilities for fabricating those picture elements. The depth dimension of the display is especially important and is dependent on the type of lighting assembly, the material from which the threshold devices are fabricated, the on-board electronics, the multiplexing schemes, and most importantly, the optical arrangement by which light is diffused, collimated and transmitted to the viewing audience. It is, inter alia, the depth dimension of liquid crystal displays that has been significantly improved by the inventive concept set forth herein and it is the reduction in that depth dimension, from about 17 millimeters between the lamp array and the diffusing/collimating lens to about 6 millimeters therebetween, which has been and will continue to be referred to as "low profile".

There are four basic elements which combine to form the electronic display 11 depicted in FIG. 3. The uppermost element is the generally rectangularly-shaped glass panel 10 upon which the rows and columns of active matrix liquid crystal picture elements as well as the associated drive circuitry, described in the preceding paragraphs, are disposed. The lowermost element is the thin, generally rectangularly-shaped back reflector panel 98 upon the interior surface of which one or more thin film layers of highly reflective material, such as aluminum or silver and a light transparent material having a low index of refraction, are deposited. Disposed immediately above the highly reflective panel 98 is an array of light sources 100 from which radiation emanates and either passes directly towards the matrix array of picture elements or is reflected off of the highly reflective panel and then passes upwardly toward said matrix array. Finally, the improved diffusing/collimating lens 102 of the instant invention is operatively located between the array of light sources 100 and the matrix array of picture elements 10. It is the combination of these four elements which define the profile, preferably the low profile, of the electronic display of the instant invention.

More specifically, it is important to note that lighting is one of the critical parameters which is employed in assessing the visual appearance of a liquid crystal display. Not only is it essential that the image of the display appear clear and bright to the viewers thereof, but it is also important that the image be substantially as clear to viewers disposed at an angle relative to the vertical plane of the viewing screen of the display. The structural and optical relationship existing between the array of light sources and the diffusing/collimating lens helps to determine the clarity and viewing angle of the display. Accordingly, these two major components will be now described in greater detail.

In the preferred embodiment of the invention illustrated in FIG. 3, the array of light sources 100 is configured as one elongated, serpentined fluorescent lamp (although it must be appreciated that a plurality of discrete lamps could be employed without departing from the spirit or scope of the instant invention) arranged in a specific pattern or lighting configuration and having each section of lamp disposed in a generally horizontal plane. More specifically, the array, regardless of configuration, will be arranged to uniformly distribute radiation emanating therefrom over the entire surface area of the matrix of rows and columns of picture elements. To this end, the lighting array is shaped in a serpentined pattern which may include a plurality of elongated lamps, such as 100a-100e, each lamp of which has a longitudinal axis parallel to the longitudinal axis of the other major lamp sections. The length of each longitudinal lamp axis is generally coextensive with the length dimension of the matrix array of picture elements. The configuration of the lighting array 100 also includes curved end sections, such as 101c-101d. The number of the elongated axial sections of the lamps and the number of the curved end sections of the lamps must be sufficient to bathe the entire width dimension of the matrix array of picture elements with a uniform shower of illumination.

The diffusing/collimating lens 102 is formed as an integral unit, vis-a-vis, prior art diffusers and collimators which were formed as two distinct elements. The integrally formed diffusing/collimating lens is a multi-lobed, generally coplanar lens array, the configuration of which is selected to substantially match the configuration of the random pattern defined by the serpentined array of fluorescent lamps. The reader will of course realize that the multiple "lobes" 102a-102e of the diffusing/collimating lens 102 of this invention are configured and operatively located so as to be substantially identical to the shape of the curved surfaces of the elongated longitudinal axes of the tubular lighting array 100. The multi-lobed, coplanar lens array 102 is positioned on the same side of the light source 100 as the matrix array of picture elements so that each coplanar lobe is associated with a respective one of the plurality of elongated, parallel, longitudinally extending lamp sections.

The integrally formed diffusing/collimating lens 102 is fabricated from a translucent material, the purpose of which is to diffuse light emanating from the array of lamps and passing either directly or via the reflector through said lens 102. More particularly, in the preferred embodiment of the invention, the transluscent material is a synthetic plastic resin and comprises bead-like elements 103 disposed in an epoxy suspension. The bead-like elements are preferably formed of glass or plastic and have a generally spherical shape. The spherical beads are preferably formed so as to have a diameter of about 1 to 100 micrometers, more preferably a diameter of about 3 to 70 micrometers, and most preferably a diameter of about 5 to 50 micrometers. It is to be noted that the epoxy suspension, from which the translucent diffusing/collimating lens 102 is fabricated, is a u.v. curable polyurethane epoxy resin system which can be purchased from Conap Corporation under the trademark Conaphane UC-32. Due to the fact that the diffusing/collimating lens 102 is fabricated of a plastic resin, the shape thereof may be readily molded to substantially match the configuration of the lobes of the array of lamps disposed immediately therebelow.

While the beads may be fabricated from almost any glass or plastic resin known to those skilled in the art and the binder may likewise be fabricated from those epoxy resins known to those skilled in the art, it is critical that the respective index of refraction of the beads and the epoxy binder differ from one another. While it is necessary to be limited to any precise values, in the preferred embodiment of the invention, the index of refraction of the beads is chosen to be about 1.6 and the index of refraction of the epoxy binder is selected to be about 1.5.

The transluscent material, as employed in the environment of the instant invention, provides numerous advantages and a synergy of advantageous features for a backlit electronic display. Of course, this synergy of features requires that the diffusing/collimating lens be configured in substantially the same coplanar, multi-lobed shape as the random lighting configuration of the array of light sources. When so configured and fabricated, the diffusing/collimating lens serves as both a light collimating lens and as a light diffusing media. The collimating effect is obtained by positioning the lobes of the lens so that the focal length thereof is at the corresponding lamp location. Simultaneously, the optical effect occurs at the air-to-material interface. And, of course, the transluscent material from which the diffusing/collimating lens is fabricated diffuses light so as to uniformly distribute light emanating from said lamps in all directions for uniformly illuminating the entire viewing screen of the electronic display.

Figure 4:
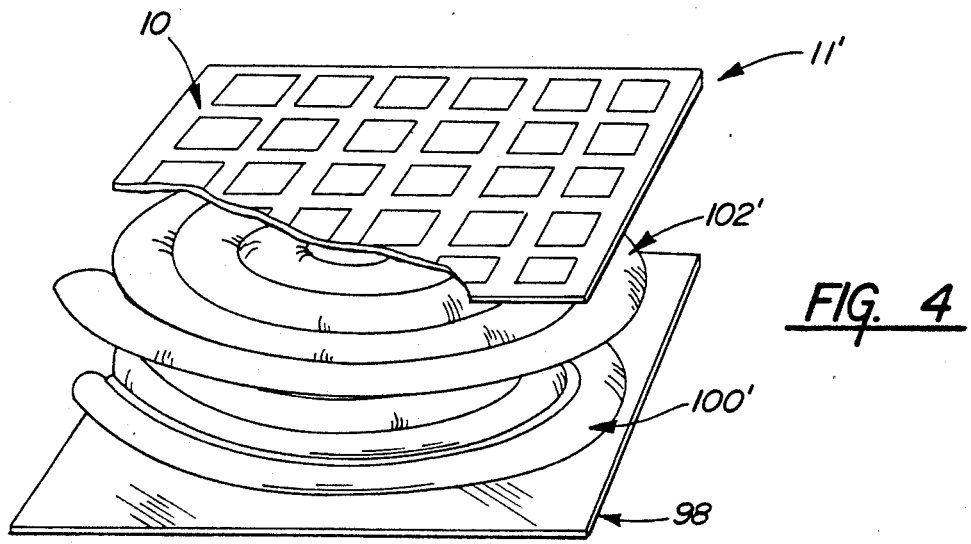
FIG. 4 is a fragmentary perspective view illustrating the relative disposition of a second preferred embodiment of the diffusing/collimating lens array of the instant invention relative to a random array of tubular lamps.

Turning now to FIG. 4, there is illustrated therein, by the reference numeral 11' a fragmentary perspective view of a second preferred embodiment of the diffusing/collimating lens array 102' of the instant invention, said lens array being operatively disposed in spaced relation to a lighting configuration 100' which is characterized by the array of lamps thereof formed as an elongated spiral. Aside from the configuration of the spiral lamps, and the corresponding configuration of the diffusing-/collimating lens array, the function, the operation and the relative location of the respective components of the electronic display 11' remain identical to the function, the operation and the disposition of the display components described hereinabove with respect to FIG. 3.

There are four basic elements which combine to form the electronic display depicted in FIG. 4. The uppermost element 10 is the rectangularly-shaped glass panel upon which the rows and columns of picture elements and drive circuitry are disposed. The lowermost element is the rectangularly shaped back reflector panel 98 upon the interior surface of which one or more highly reflective layers are deposited. Disposed above the reflective panel 98 is the array of light sources 100' adapted to generate and transmit a uniform body of radiation to and through the matrix array. Finally, a second embodiment of the improved diffusing/collimating lens 102' is located between the lamp array and the matrix array of picture elements.

In contrast to the configuration of the array of light sources 100 illustrated in FIG. 3, the serpentined array of lamps 100' depicted in FIG. 4 is generally shaped as a spiral or helical configuration. The purpose of illustrating such a configuration is to demonstrate to the reader hereof that the improvement described in the instant specification is not limited to any specific shape of elongated lamps, but can be employed with any lighting arrangement which will provide a high level of illumination over the entire surface area of the large area viewing screen of the electronic display. The point which is important to note however is that there must exist a correspondence in shape between that of the lighting configuration and that of the diffusing/collimating lens array. In other words, in the FIG. 4 embodiment of the instant invention, the lobes of the multi-lobed diffusing/collimating lens correspond to the shape and the disposition of the cylindrically shaped, helically arrayed lamps which are situated therebeneath. In this manner, the focal length of the diffusing-/collimating lens will be optimally spaced from the corresponding source of radiation to collimate light across the viewing screen.

Figure 5:
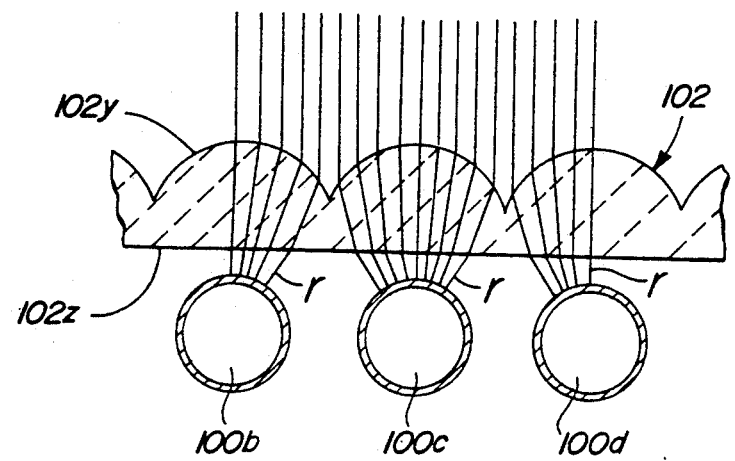
FIG. 5 is cross-sectional view taken along line 5—5 of FIG. 3 and illustrating the manner in which rays of light emanating from the axially aligned lighting configuration of FIG. 3 are split and collimated by the optical media of the diffusing/collimating lens array of the instant invention.

Turning now to FIG. 5, there is depicted therein a cross-sectional view taken along line 5-5 of FIG. 3, said cross-sectional view provided to demonstrate the manner in which rays of light "r" emanating from the lamps 100b-100c of the lighting configuration 100 are collimated to present a sharp image to the viewing audience of the liquid crystal display of the instant invention. More particularly, there is depicted a plurality of lamps, such as 101b, 101c, and 101d, of the embodiment of the lighting configuration wherein the longitudinal axes thereof are disposed in substantially parallel alignment. As can be seen from a perusal of FIG. 5, the rays of light "r" emanating from the three parallel, but spacedly disposed lamps are directed upwardly through the relatively thin diffusing/collimating lens 102. At both the planar air-to-material interface 102z and the lobed material-to-air interface 102y thereof, the rays of light are collimated and transmitted to the viewers in that collimated fashion. Note that for purposes of illustrating the collimating effect of the multi-lobed lens array of the instant invention, neither the reflector plate 98 nor the matrix array 10 of rows and columns of liquid crystal picture elements are depicted in FIG. 5. Further, and also so as not to detract from the description of the collimating effect, the optical media from which the diffusing/collimating lens is fabricated has not been shown to include the spherically-shaped glass beads 103. Also in this regard, the reader is no doubt aware of the fact that in FIG. 3 only two of the beads are illustrated, although it is to be understood that those beads are randomly dispersed throughout the thickness of the translucent epoxy binder material from which the diffusing/collimating lens is fabricated.

While the foregoing paragraphs have described the inventive concept set forth in the this specification, the instant inventors do not intend to have the disclosed invention limited by the detailed embodiments, drawings or description; rather, it is intended that the instant invention should only be limited by the scope of the claims which follow hereinafter, as well as all equivalents thereof which would be obvious to those routineers of ordinary skill in the art.

We claim:

1. In a backlit liquid crystal display which includes a source of light; a matrix array of rows and columns of liquid crystal picture elements spacedly disposed from one side of said light source; means for diffusing light emanating from the light source, said diffusing means operatively disposed between said light source and said rows and columns of liquid crystal picture elements; and means for collimating light, said collimating means operatively disposed between said diffusing means and said light source; said liquid crystal display capable of providing an image to a remotely positioned observer; the improvement comprising, in combination:

said diffusing means and said collimating means forming an integral diffusing/collimating lens, which integral diffusing/collimating lens comprises a multi-lobed coplanar lens array fabricated from a transluscent material including bead-like elements with an index of refraction of about 1.6 disposed in a binder suspension having an index of refraction of about 1.5, whereby a bright, uniform, light distribution is provided in a low profile assembly.

2. A display as in claim 1, further including a backreflector operatively disposed on the side of said light source opposite said diffusing/collimating lens.

3. A display as in claim 1, wherein said light source is configured as a single, elongated, serpentined, tubular lamp.

4. A display as in claim 3, wherein the serpentined, tubular lamp configuration defines a random pattern, and wherein the configuration of the multi-lobed lens array is substantially identical to the configuration of the random pattern defined by the tubular lamp lighting configuration.

5. A display as in claim 3, wherein the serpentined lamp configuration defines a series of generally parallel, elongated lamps having generally parallel, elongated axes, and wherein the multi-lobed coplanar lens array is operatively positioned on the same side of the light source as the matrix array so that each coplanar lobe is associated with a corresponding elongated axis of the lamps.

6. A display as in claim 1, wherein said light source is configured as a plurality of discrete tubular lamps, said discrete lamps defining a lighting configuration.

7. A display as in claim 4, wherein the discrete, tubular lamps define a random pattern, and wherein the configuration of the multi-lobed lens array is substantially identical to the configuration of the random pattern defined by the discrete lamp lighting configuration.

8. A display as in claim 4, wherein the discrete tubular lamp lighting configuration defines a series of generally parallel, elongated lamps having generally parallel, elongated axes, and wherein the multi-lobed coplanar lens array is operatively positioned on the same side of the light source as the matrix array so that each coplanar lobe is associated with a corresponding parallel axis of the lamps.

9. A display as in claim 1, wherein said diffusing/collimating lens is characterized by a focal length and said diffusing/collimating lens is positioned a distance from the light source which is substantially equal to said focal length.

10. A display as in claim 1, wherein the bead-like elements are glass.

11. A display as in claim 10, wherein said glass bead-like elements are spherically shaped.

12. A display as in claim 10, wherein said light diffusing glass beads have a diameter of at least about 1 to 100 micrometers.

13. A display as in claim 12, wherein the binder in which said spherically shaped glass bead-like elements are disposed is a translucent epoxy suspension.

14. A display as in claim 1, wherein the liquid crystal display is an active matrix liquid crystal display.

15. A display as in claim 1, wherein each liquid crystal picture element comprises a pair of electrodes having liquid crystal material disposed therebetween and at least one threshold device connected at one of the terminals thereof to one of said electrodes.

16. A display as in claim 15, wherein said at least one threshold device comprises a transistor formed from deposited layers of semiconductor material.

17. A display as in claim 15, wherein the threshold devices comprise diodes formed from deposited layers of semiconductor material.

18. A display as in claim 15 wherein a pair of threshold devices are provided, said threshold devices electrically coupled together at a common node in non-opposing series relationship.

19. A display as in claim 18, wherein the semiconductor material is an amorphous silicon alloy material.

* * * * *